Nov. 24, 1959 H. KLAUE 2,914,141
DISC BRAKE, PARTICULARLY FOR MOTOR VEHICLES
Filed March 1, 1957 5 Sheets-Sheet 4

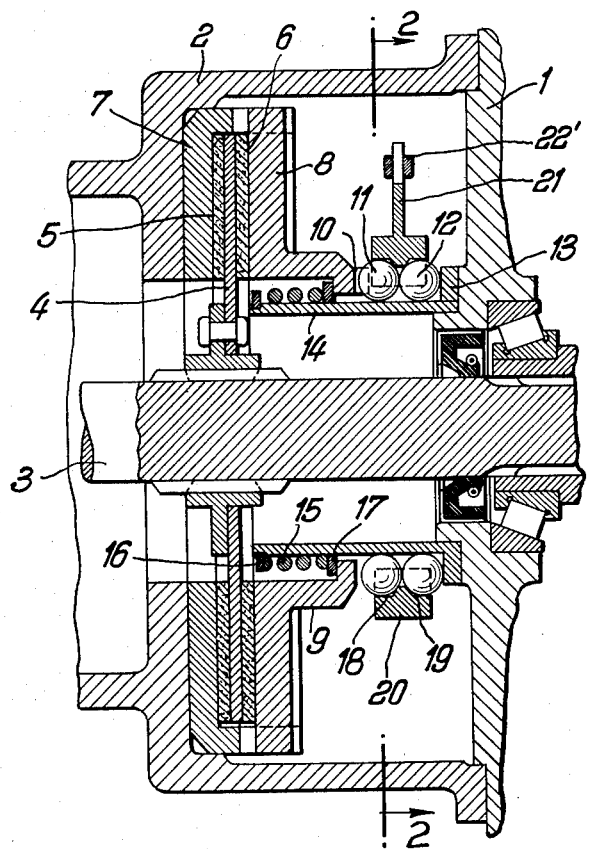

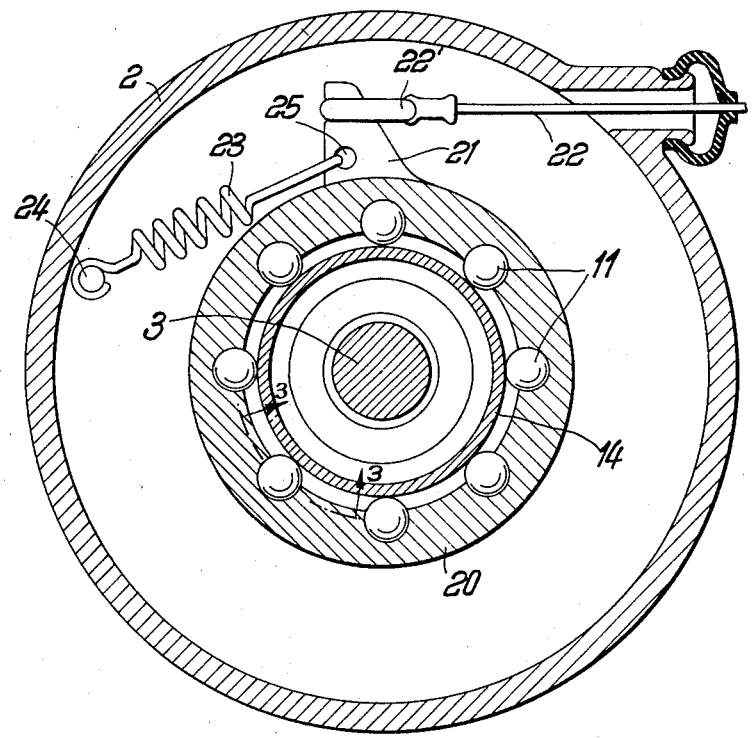
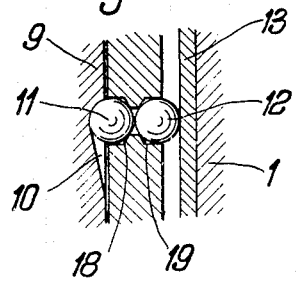

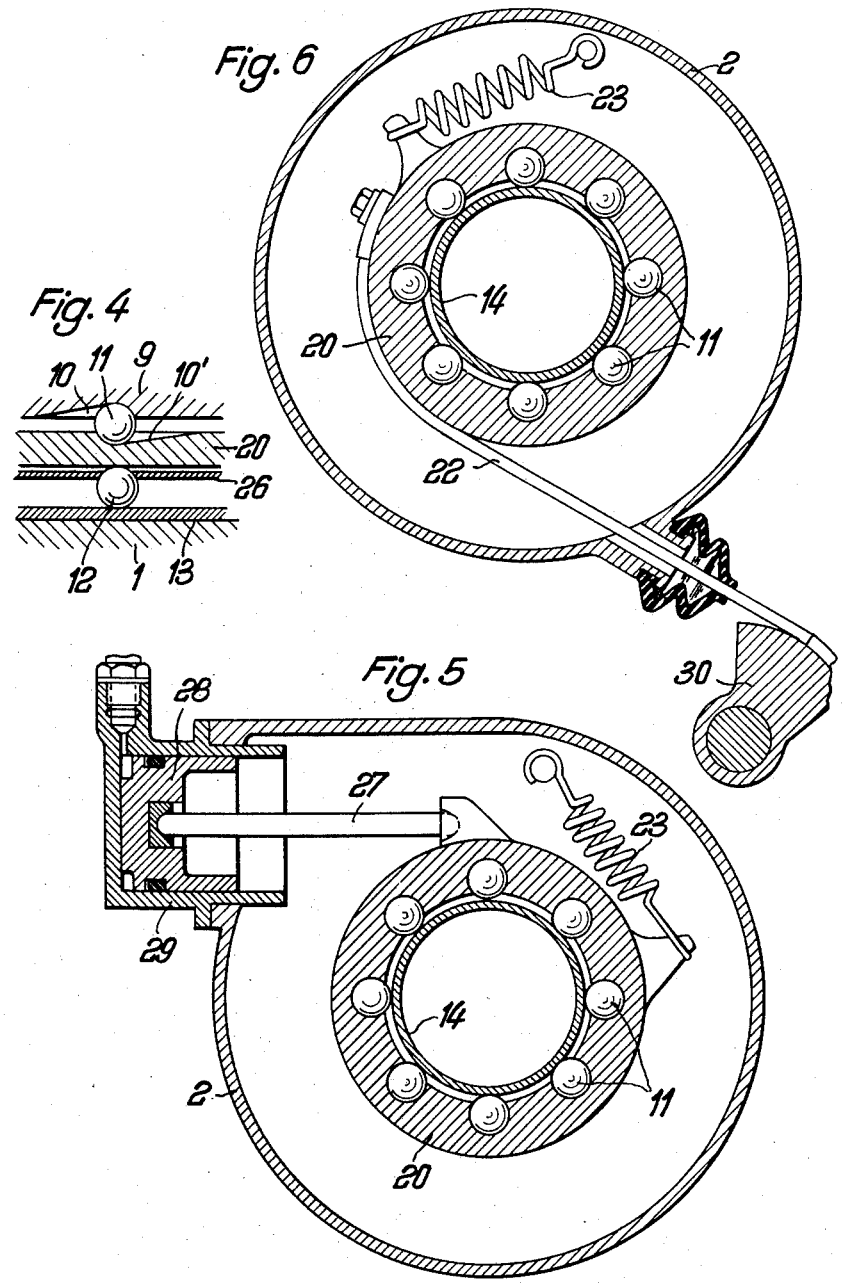

Inventor:
Hermann Klaue
By Reeman & Mermoroh
Agents

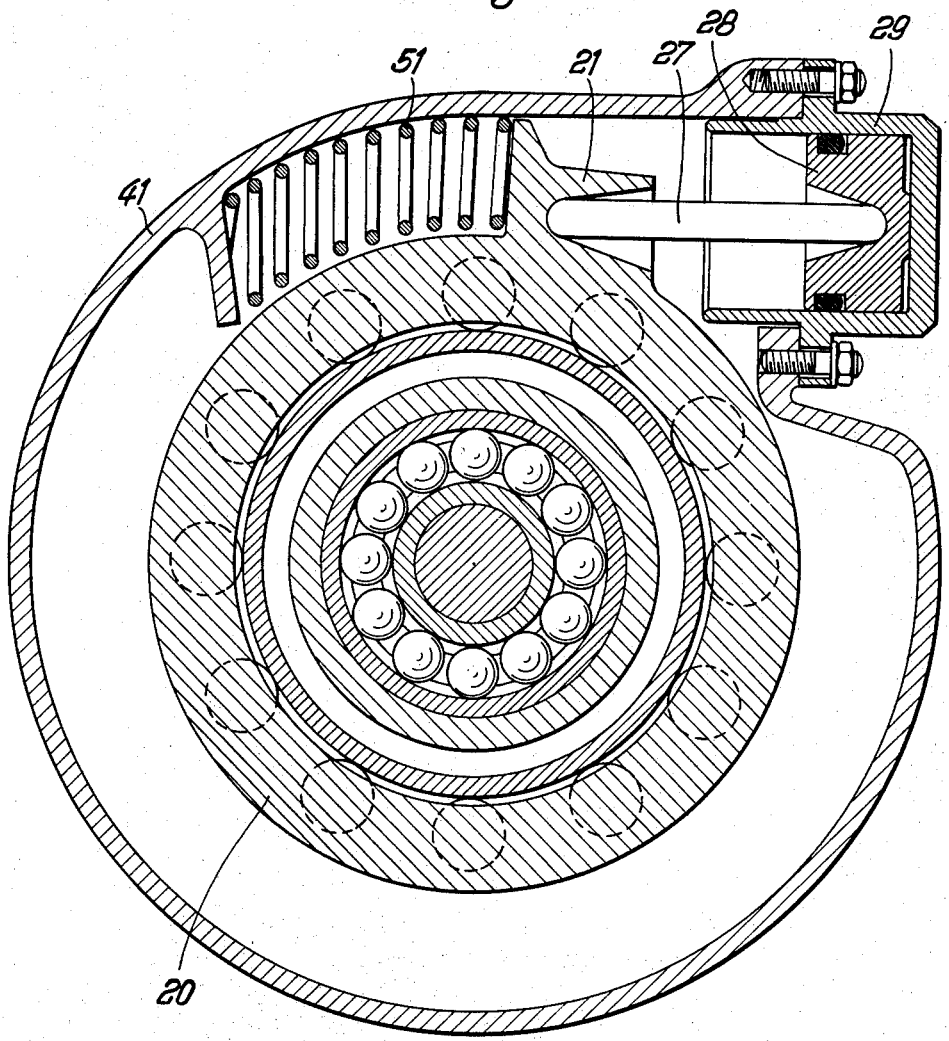

2,914,141

DISC BRAKE, PARTICULARLY FOR MOTOR VEHICLES

Hermann Klaue, Überlingen, Bodensee, Germany

Application March 1, 1957, Serial No. 643,338

Claims priority, application Germany March 3, 1956

2 Claims. (Cl. 188—72)

Disc brakes are known wherein two brake discs, which are free to move axially, and which are provided on the outside with brake lining and on the inside with recesses rising in the peripheral direction and serving to receive balls, are mounted in a rotating housing. In order to press the brake discs against the rotating housing there is provided a rotatable ring which comprises, on its periphery, recesses in the form of bores which are each adapted to receive two balls which rest against one another and which, at the same time, serve as connecting links between the brake discs.

Such brakes are particularly suitable for applications in which the brake housing can be adapted for the satisfactory dissipation of the resulting frictional heat into the free stream of air. If this is not possible, then it is an advantage to construct the rotating portion of the brake in the form of one or more lamellae provided with lining, against which the stationary brake discs are urged.

It is the object of the invention to provide a hydraulically or pneumatically actuated solid disc brake of the above-mentioned type with stationary brake housing suitable for high thermal stresses.

The solution of this problem consists, according to the invention, in that an axially movable pressure plate, which is constructed in the form of a counter brake-disc and which is mounted inside the brake housing, or a ring which is coaxial with said pressure plate and in frictional contact therewith, is provided on the side remote from the brake disc with recesses which rise in the peripheral direction and are evenly distributed about the circumference, and in which are mounted balls which are held by a brake actuating ring which is mounted perpendicular to the centre axis of the brake and which carries a further set of balls affording a rolling support for said ring. This actuating ring may also itself be equipped with recesses rising in the peripheral direction, in which lie the actuating balls. The rolling support on the stationary wall of the housing is then afforded by a further set of balls. This solution has the advantage that all the balls only roll whereas with supporting balls rolling against one another and lying in bores in the actuating ring, friction occurs in said bores on actuation.

With a closed brake housing, the pressure plate constructed in the form of a counter brake-disc should be fixed to a cup spring which is gripped at its outer periphery the brake housing and the cover of the brake housing and which serves to transmit the brake couple and to restore the pressure plate, and the hydraulic or pneumatic actuating device, for the brake-actuating ring which is mounted inside the brake housing and which is coupled to the pressure plate through balls mounted in recesses rising in the peripheral direction, should be fixed externally to the cover of the brake housing.

Further details of the invention may be seen from the following description of some embodiments of the idea of the invention made with reference to Figures 1 to 8.

Figure 1 illustrates in section through the longitudinal axis of the brake, a disc brake which is housed, for example, in the axle casing of a tractor.

Figure 2 shows a section perpendicular thereto, on the line 2—2 in Figure 1;

Figure 3 shows a section through part of the brake-actuating ring, on the line 3—3 in Figure 2;

Figure 4 is a section through a similar part but showing a different construction of the brake-actuating ring;

Figure 5 shows a section perpendicular to the brake axis, from which can be seen the hydraulically or pneumatically actuated device for pivoting the brake-actuating ring in the circumferential direction.

Figure 7:
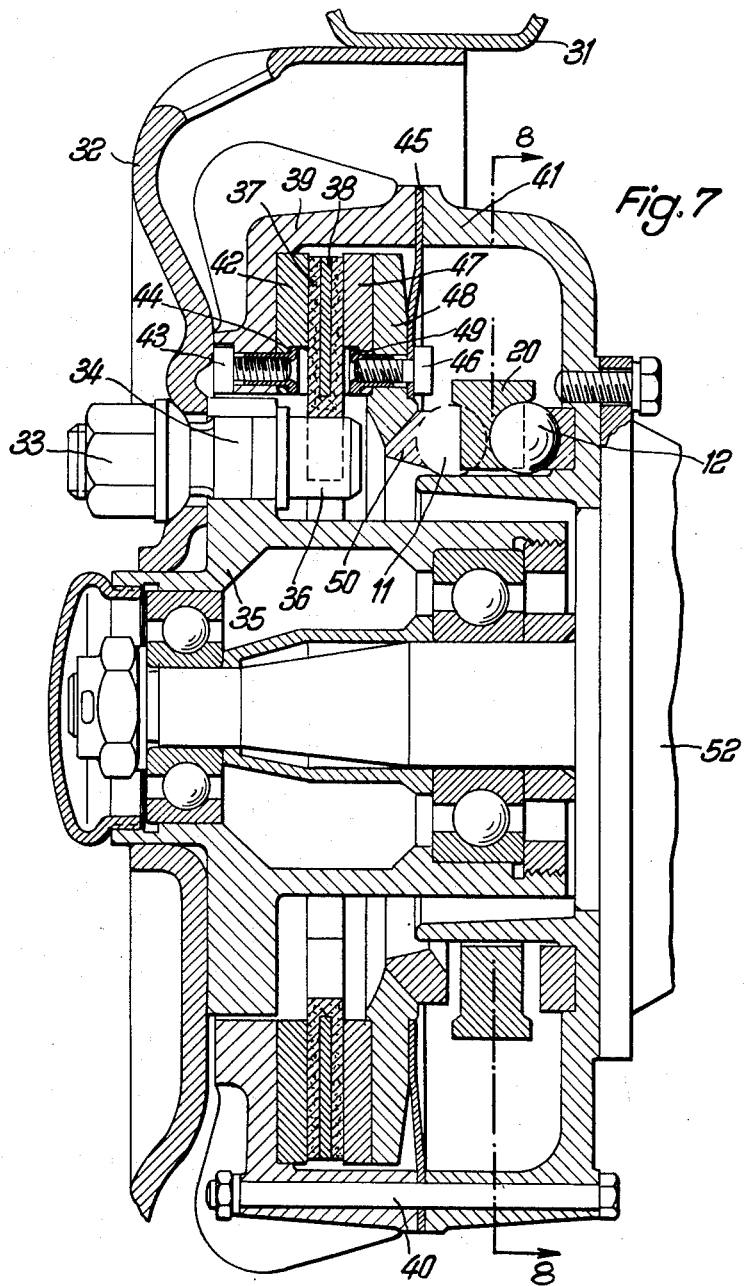

In the embodiment shown in Figure 6, the pivoting of the brake-actuating ring is effected by means of a cable line;

Figure 7 represents a section through the longitudinal axis of a motor car brake;

Figure 8 shows a section perpendicular thereto, on the line 8—8 in Figure 7;

First the tractor brake will be described with reference to Figures 1 to 6 and then the motor-car brake with reference to Figures 7 and 8.

In Figure 1, the reference numeral 1 represents the diagrammatically indicated gear casing, to which is fixed the axle casing 2. Connected to the rear axle 3—for free axial movement—is the brake disc 4 which is provided with the brake linings 5 and 6. The brake housing 7 is bolted to the axle casing 2. The former carries—for axial displacement in recesses—the pressure plate 8 which is constructed in the form of a counter brake-disc. This pressure plate is provided with a cylindrical extension 9 on the face of which remote from the brake-disc 4 are provided—uniformly distributed round the circumference—recesses 10 which rise in the peripheral direction. Mounted in these recesses are balls 11 which are rollingly supported, through balls 12, against the flange 13 of the sleeve 14 fixed to the gear casing 1. The sleeve 14 serves simultaneously to centre the balls and to receive the compression spring 15 which rests against the locking ring 16 and urges the pressure plate 8 back away from the brake disc 4, through a washer 17.

The balls 11 and 12 are mounted in the bores 18 and 19 in the brake-actuating ring 20. The latter—as can be seen from Figure 2—is equipped with an extension 21 on which the cable 22, serving for actuation, is suspended by means of the eye 22'. The tension spring 23, which is fixed to a pin 24 on the gear casing 1 and engages in the hole 25 in the extension 21, effects the restoration of the brake-actuating ring 20 after the completion of the brake operation.

In order to initiate the braking, the cable 22 is pulled through a brake pedal or brake hand lever, not illustrated in the drawing, and the brake-actuating ring 20, which is rollingly supported against the sleeve 14 through balls 11 and 12, is thus turned. As a result of this turning, the balls 11 roll up in the recesses 10 and press the pressure plate 8 against the brake housing 7 or against the brake disc 4. On completion of the brake operation, the tension spring 23 pulls the brake-actuating ring 20 back into the initial position. The compression spring 15 then removes the pressure plate 8 from the brake disc 4.

Figure 4 shows, in section, part of another embodiment of the brake-actuating ring 20. This ring is provided with recesses 10' rising circumferentially. The balls 12 mounted therein do not rest against one another but against the brake-actuating ring 20. The balls are kept at equal distances apart by means of the sheet-metal cage 26. Such a form of construction of the brake-actuating ring has the advantage that, during the brake actuation, all forces are rollingly transmitted. In the embodiment of the brake-actuating ring as shown in Figure 3, friction occurs in the bores 18 and 19.

In the embodiment shown in Figure 5, the brake-actuating ring 20 is turned through the push-rod 27 by the hydraulically or pneumatically driven piston 28 which is mounted in the cylinder 29.

In the embodiment shown in Figure 6, the cable 22 is taken some distance round the brake-actuating ring 20 so as to eliminate any lengthening of the lever arm during the brake actuation.

The same type of fixing is also selected for the cable 22 on the actuating lever 30.

The motor car brake illustrated in Figures 7 and 8 is actuated in exactly the same manner as the tractor brake shown in Figures 1 to 6, by means of the brake-actuating ring 20, in which are mounted the balls 11 and 12. The parts of the motor car brake which differ somewhat in construction are provided with different reference numerals from those in the tractor brake in the following description of Figures 7 and 8.

The rim portion of the motor vehicle wheel bears the reference numeral 31. It is connected to the wheel disc 32, which is rigidly connected to the wheel hub 35 by means of the hub nuts 33 through studs 34. The studs 34 comprise cylindrical extensions 36 on which the brake discs 38, which are provided with brake lining 37, are mounted for free axial movement.

The brake housing 39, which is provided with ribs, is bolted to the cover 41 of the brake housing by means of bolts 40. It is advisable to manufacture the brake housing of light metal so as to ensure a satisfactory removal of the brake heat which arises. Mounted in the brake housing 39 are friction segments 42, which are uniformly distributed round the periphery and which are connected to the brake housing 39 by means of screws 43 and threaded sleeves 44.

The cover 41 of the brake housing is rigidly connected to the stationary portion of the vehicle, namely to the axle journal or to the axle carrier 52. Fixed between the brake housing 39 and the housing cover 41 is a cup spring 45, which is preferably slotted in construction and which is screwed to the pressure plate 48 by means of the screws 46 which simultaneously connect the friction segments 47 to the pressure plate 48. In this case, too, the screw connection is effected by means of threaded sleeves 49. The pressure plate 48 is mounted on the cup spring 45 for free axial movement. The cup spring serves not only to transmit the braking couple but also to restore the pressure plate 48 to the initial position after the termination of the braking operation.

The actuation of the brake is effected by means of the pivoting brake-actuating ring 20 which transmits the brake pressure through recesses rising circumferentially and rows of balls 11 and 12 mounted therein, to a pressure ring 50, through corresponding recesses. This pressure ring is in frictional contact with the pressure plate 48.

As can be seen from Figure 8, the brake-actuating ring 20 comprises an extension 21 on which a sealed piston 28, which is mounted in a cylinder 29 fixed to the cover 41 of the brake housing, acts through a push-rod 27. The restoration of the brake-actuating ring 20 to the initial position after the braking operation is effected by means of a compression spring 51.

I claim:

1. A disc brake, for use in connection with the axle and a stationary part of an automobile wheel, comprising a stationary brake housing enclosure structure connected to said stationary part and composed of two annular housing portions releasably secured to each other along a median surface, a brake disc mounted on said axle for rotation thereon and disposed in said housing and having brake lining, a first pressure member movable at right angle to the axis of rotation of said disc towards and from said disc, an annular disc-shaped spring secured to said housing throughout said median surface and extending on the interior of said housing and suspending said first pressure member and urging it away from said disc for brake release, and a second pressure member, said disc being disposed between said pressure members, said pressure members being non-rotatable, and means operable for moving said first pressure member towards said disc against the power of said spring for frictional brake engagement thereof comprising a raceway structure, balls in said raceway structure, said raceway structure including two annular members encircling said axis and at least one being rotatable about said axis and having recesses and being axially movable against the other thereby changing the distance between said anular members, means between one of said annular members and said first pressure member for transmitting the changes in distances between said annular members to said pressure member, and means operable for rotating said one annular member.

2. A disc brake as claimed in claim 1, said means from rotating said annular member comprising a hydraulic cylinder and piston, and a piston rod interconnecting said piston and said one annular member, and a retraction spring urging said annular member to a rest position of minimal distance from said other annular member.

References Cited in the file of this patent

UNITED STATES PATENTS

| | | |
|---|---|---|
| 1,635,708 | Cassel | July 12, 1927 |
| 1,740,993 | McDonnell | Dec. 24, 1929 |
| 2,014,348 | Woodward | Sept. 10, 1935 |
| 2,024,328 | Batie | Dec. 17, 1935 |
| 2,026,945 | Lane | Jan. 7, 1936 |
| 2,163,884 | LaBrie | June 27, 1939 |
| 2,185,435 | Goepfrich | Jan. 2, 1940 |
| 2,262,708 | Lambert | Nov. 11, 1941 |
| 2,786,560 | Ishoy | Mar. 26, 1957 |

FOREIGN PATENTS

| | | |
|---|---|---|
| 167,254 | Great Britain | Aug. 2, 1921 |